United States Patent [19]

Eli et al.

[11] Patent Number: 5,082,560
[45] Date of Patent: Jan. 21, 1992

[54] METHOD AND APPARATUS FOR TREATING A LIQUID MIXTURE

[75] Inventors: Nissim Eli; Albert Marrache, both of Herzelia, Israel

[73] Assignee: Odis Irrigation Equipment Ltd., Kiryat Arye, Petah Tikva, Israel

[21] Appl. No.: 457,547

[22] Filed: Mar. 9, 1990

[30] Foreign Application Priority Data

Mar. 20, 1989 [IL] Israel .......................... 89685

[51] Int. Cl.[5] .................. B01D 21/26; B01D 21/01
[52] U.S. Cl. ............................ 210/206; 210/199; 210/205; 210/512.1; 210/738; 210/788; 210/498
[58] Field of Search ........... 210/738, 787, 788, 198.1, 210/199, 205, 206, 512.1, 498, 193

[56] References Cited

U.S. PATENT DOCUMENTS

| | | | |
|---|---|---|---|
| 3,819,053 | 6/1974 | Milotich | 210/512.1 |
| 4,347,141 | 8/1982 | Rothberg | 210/738 |
| 4,539,120 | 9/1985 | Robinson | 210/205 |

*Primary Examiner*—Stanley S. Silverman
*Assistant Examiner*—Neil M. McCarthy
*Attorney, Agent, or Firm*—Benjamin J. Barish

[57] ABSTRACT

A method and apparatus for treating a liquid mixture to separate a clarified fraction therefrom leaving a concentrated sludge fraction involve injecting a flocculent material into the liquid mixture; and inletting the liquid material and the flocculent maerial tangentially into a vertical tank having a perforated plate spaced from its upper end dividing the tank into an upper chamber and a lower chamber, a to produce a flow in the lower chamber having a rotational velocity in the horizontal direction adjacent the outer periphery of the lower chamber, and a lower rotational velocity in the horizontal direction adjacent the center of the lower chamber. The holes in the perforated plate define reduced-area passages from the lower chamber to the upper chamber producing a vertical flow of low velocity in the lower chamber and of higher velocity through the passage in the perforated plate.

9 Claims, 1 Drawing Sheet

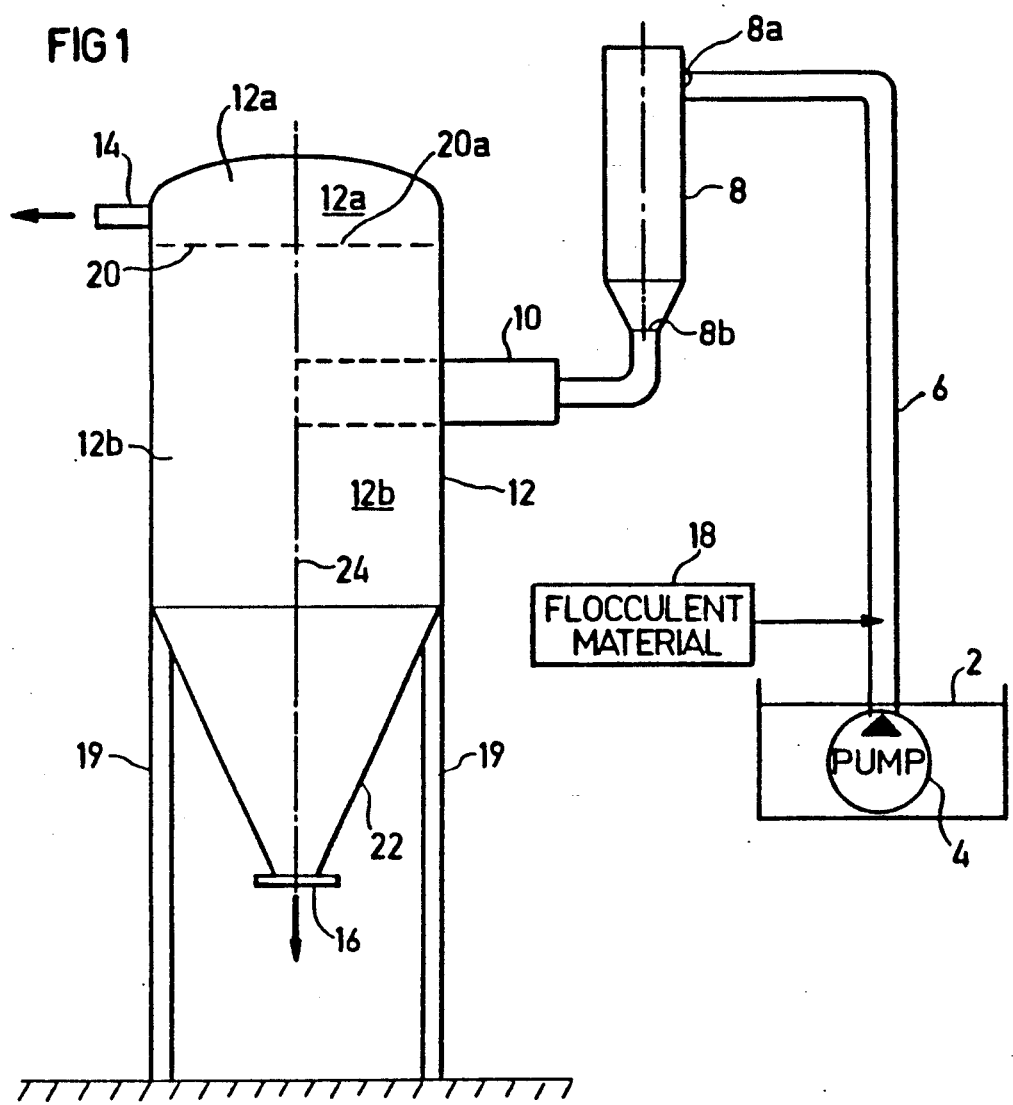
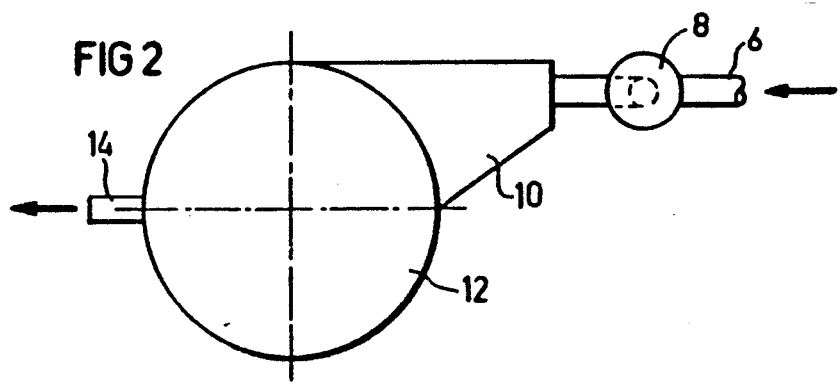

METHOD AND APPARATUS FOR TREATING A LIQUID MIXTURE

BACKGROUND OF THE INVENTION

The present invention relates to a method and apparatus for treating a liquid mixture in order to separate a clarified fraction therefrom, leaving a concentrated sludge fraction. The invention is particularly applicable for treating municipal or industrial waste water in order to enable such waste water to be reused for municipal, industrial or agricultural purposes.

Municipal or industrial waste water, as well as water from rivers or lakes, must first be treated in order to remove substances which may be harmful, or which cause bad taste or odour. Many techniques are known for this purpose. One technique is a sedimentation technique wherein the solid particles or other heavy substances are permitted to separate by sedimentation from the liquid mixture, but the conventional sedimentation technique requires a relatively long period of time for the solid particles or heavy substances to settle. In order to increase the rate at which the solid particles settle, a flocculent material may be added to the liquid mixture, the flocculent material tending to flock or agglomerate with the solid particles thus enhancing the settling of the solid particles. However, relatively long periods of time are required even when using such flocculent materials.

OBJECTS AND SUMMARY OF THE INVENTION

An object of the present invention is to provide a method, and also an apparatus, for treating a liquid mixture in order to accelerate this process of separating the clarified fraction from the concentrated sludge fraction (the agglomerated solid particles).

According to the present invention, there is provided a method of treating a liquid mixture to separate a clarified fraction therefrom leaving a concentrated sludge fraction, comprising: injecting a flocculent material into the liquid mixture; and inletting the liquid material and the flocculent material into a vertical tank having a perforated plate spaced from its upper end dividing the tank into an upper chamber and a lower chamber. The liquid material mixture is inletted tangentially into the lower chamber of the tank at a location substantially above its bottom, to produce a flow in the lower chamber having a rotational velocity in the horizontal direction adjacent the outer periphery of the lower chamber, and a lower rotational velocity in the horizontal direction adjacent the center of the lower chamber. The holes in the perforated plate define reduced-area passages from the lower chamber to the upper chamber producing a vertical flow of low velocity in the lower chamber and of higher velocity through the passages in the perforated plate. Thus, the flocculent material flocks with most of the solid particles in the liquid mixture at the lower part of the lower chamber and with the remaining solid particles at the upper part of the lower chamber, such that a clarified fraction passes through the holes in the plate to the upper chamber, leaving a concentrated sludge fraction in the lower chamber. The clarified liquid fraction is outletted radially from the upper chamber and the concentrated sludge fraction is outletted from the lower chamber.

Since the liquid mixture is inletted tangentially into the lower chamber of the tank at a location remote from the bottom of the lower chamber, no sludge blanket is formed below the perforated screen which would impede and slow down the passage of the clarified fraction to the uper chamber. In addition, since the clarified fraction is outletted from the upper chamber in the radial direction, there is produced a flow of the clarified fraction radially across the upper surface of the perforated plate, thereby permitting settling of solid particles in the clarified fraction through the perforated plate back to the lower chamber.

In the preferred embodiment of the invention described below, the perforated plate is a flat horizontal plate; further the concentrated sludge fraction is outletted through a conical funnel at the bottom of the lower chamber.

The invention also provides apparatus for treating a liquid mixture in accordance with the above method to separate a clarified fraction therefrom, leaving a concentrated sludge fraction.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates one form of apparatus constructed in accordance with the invention; and FIG. 2 is a top plan view of the apparatus of FIG. 1.

DESCRIPTION OF A PREFERRED EMBODIMENT

The apparatus illustrated in the drawings is intended particularly for treating municipal or industrial waste water in order to make it suitable for reuse for municipal, industrial or agricultural purposes. The waste water is collected in a reservoir 2 and is pumped by a pump 4 via a feed tube 6 to a flocculent material mixing vessel 8 and then to the inlet 10 of a sedimentation tank 12. There, the water is separated into a clarified fraction removed via an outlet 14 at the upper end of the tank, and a concentrated sludge fraction removed via an outlet 16 at the lower end of the tank. The flocculent material is injected from a source 18 into the raw feed water passing through the feed tube 6 so that the two are mixed in vessel 8 before the mixture is introduced into the sedimentation tank 12. The mixture of the raw feed water and the flocculent material is introduced via inlet 8a at the upper end of vessel 8, and is removed via its outlet 8b at the bottom of the vessel.

Sedimentation tank 12 is a large, vertical, cylindrical tank supported above the ground by legs 19. The tank includes a flat perforated plate 20 fixed horizontally at the upper end of the tank so as to divide its interior into an upper chamber 12a and a lower chamber 12b. The clarified water outlet 14 at the upper end of tank 12 is above perforated plate 20, to communicate with the upper chamber 12a, and, as shown in FIG. 2, extends radially of the upper chamber 12a. The concentrated-sludge outlet 16 is at the bottom of the lower chamber 12b and is provided with a conical funnel 22 so as to direct the concentrated sludge settling at the bottom of the chamber through outlet 16 The inlet 10 into the tank 12 is approximately midway between the perforated plate 20 and the upper end of conical funnel 22.

As shown particularly in FIG. 2, the inlet 10 is tangential to the tank 12 so as to impart a rotational flow of the mixture of raw feed water and flocculent material when introduced into the lower chamber 12b. This flow into the lower chamber 12b has a rotational velocity in the horizontal direction adjacent the outer periphery of the lower chamber, and a lower rotational velocity in the horizontal direction adjacent the central axis 24.

Perforated plate 20 is formed with a plurality of holes 20a defining reduced-area passages from the lower chamber 12b to the upper chamber 12a. These reduced-area passages produce a vertical flow of higher velocity through the passages 12a than in the lower chamber 12b, tending to cause the flocculent material, injected from source 18, to flock or aggregate with the solid particles or other heavy substance in the raw feed water in the lower chamber and to separate in the lower chamber. The higher velocity of the liquid at the mouth of the holes 20a, and the reduced-area of the passages for the liquid through the holes which brings the remaining particles closer together, increases the flocculation efficiency, and thereby produces a clarified fraction which passes through these holes into the upper chamber 20 and out through outlet 14. The aggregates of flocking material, solid particles and other heavy substances in the raw feed water, settle in the form of a concentrated sludge fraction directed by funnel 22 to the outlet 16.

It has been found that the apparatus illustrated in the drawings is effective to substantially reduce the time for separating the raw feed water into the clarified fraction removed via outlet 14 and the concentrated sludge fraction removed via outlet 16. For example, it has been found that a tank of 1.20 meters in diameter and a volume of 2.5 cubic meters is able to treat raw feed water having 15 grams per liter of solids at a rate of 30 cubic meters per hour.

While the invention has been described with respect to one preferred embodiment, it will be appreciated that many other variations, modifications and applications of the invention may be made.

What is claimed is:

1. Apparatus for treating a liquid mixture to separate a clarified fraction therefrom leaving a concentrated sludge fraction, comprising:
   a vertical tank having a perforated plate spaced from its upper end dividing the tank into an upper chamber and a lower chamber;
   means for injecting a flocculent material in the liquid mixture;
   a tangential inlet in said lower chamber of the vertical tank at a location substantially above its bottom for inletting the liquid mixture and flocculent material tangentially into the lower chamber to produce a flow in said lower chamber having a rotational velocity in the horizontal direction adjacent to the outer periphery of said lower chamber, and a lower rotational velocity in the horizontal direction adjacent to the center of said lower chamber;
   the holes in said perforated plate defining reduced-area passages from the lower chamber to the upper chamber producing a vertical flow of low velocity in the lower chamber and of higher velocity through said passages, whereby the flocculent material flocks with most of the solid particles in the liquid mixture at the lower part of the lower chamber and with the remaining solid particles at the upper part of the lower chamber, such that a clarified fraction passes through the holes in the plate to the upper chamber, leaving a concentrated sludge fraction in the lower chamber;
   a radial outlet in the upper chamber for outletting the clarified fraction therefrom to produce a radial flow of the clarified fraction in the upper chamber radially across the perforated plate thereby permitting settling of solid particles in the clarified fraction through the perforated plate back to the lower chamber; and
   an outlet in the bottom of the lower chamber for outletting the concentrated sludge fraction therefrom.

2. The apparatus according to claim 1, wherein said perforated plate is a flat horizontal plate.

3. The apparatus according to claim 1, wherein said outlet in the lower chamber outletting the concentrated sludge fraction therefrom comprises a conical funnel at the lower end of the lower chamber.

4. The apparatus according to claim 3, wherein said tangential inlet into the lower chamber is located approximately midway between said perforated plate and the upper end of said conical outlet at the lower end of the lower chamber.

5. The apparatus according to claim 1, wherein said means for injecting a flocculent material into the liquid mixture comprises:
   a mixing vessel having an inlet pipe connected to the source of the liquid mixture, and an outlet pipe connected to the tangential inlet of the tank;
   and an injector connected to said inlet pipe for injecting the flocculent material into the liquid mixture before it enters said mixing vessel such that the flocculent material is mixed with the liquid mixture before the latter is introduced into said tangential inlet of the vertical tank.

6. Apparatus for treating a liquid mixture to separate a clarified fraction therefrom leaving a concentrated sludge fraction, comprising:
   a vertical tank having a perforated plate spaced from its upper end dividing the tank into an upper chamber and a lower chamber;
   a tangential inlet in said lower chamber of the vertical tank at a location substantially above its bottom for inletting the liquid mixture and flocculent material tangentially into the lower chamber to produce a flow in said lower chamber having a rotational velocity in the horizontal direction adjacent to the outer periphery of said lower chamber, and a lower rotational velocity in the horizontal direction adjacent to the center of said lower chamber;
   the holes in said perforated plate defining reduced-area passages from the lower chamber to the upper chamber producing a vertical flow of low velocity in the lower chamber and of higher velocity through said passages, whereby the flocculent material flocks with most of the solid particles in the liquid mixture at the lower part of the lower chamber and with the remaining solid particles at the upper part of the lower chamber, such that a clarified fraction passes through the holes in the plate to the upper chamber, leaving a concentrated sludge fraction in the lower chamber;
   a mixing vessel having an inlet pipe connected to the source of the liquid mixture, and an outlet pipe connected to the tangential inlet of the tank;
   an injector connected to said inlet pipe for injecting the flocculent material into the liquid mixture before it enters said mixing vessel such that the flocculent material is mixed with the liquid mixture before the latter is introduced into said tangential inlet of the vertical tank;

a radial outlet in the upper chamber for outletting the clarified fraction therefrom to produce a radial flow of the clarified fraction in the upper chamber radially across the perforated plate thereby permitting settling of solid particles in the clarified fraction through the perforated plate back to the lower chamber; and an outlet in the bottom of the lower chamber for outletting the concentrated sludge fraction therefrom.

7. The apparatus according to claim 6, wherein said perforated plate is a flat horizontal plate.

8. The apparatus according to claim 6, wherein said outlet in the lower chamber outletting the concentrated sludge fraction therefrom comprises a conical funnel at the lower end of the lower chamber.

9. The apparatus according to claim 8, wherein said tangential inlet into the lower chamber is located approximately midway between said perforated plate and the upper end of said conical outlet at the lower end of the lower chamber.

* * * * *